United States Patent [19]

Frantz et al.

[11] Patent Number: 4,758,878

[45] Date of Patent: Jul. 19, 1988

[54] CIRCUIT FOR CONVERTING A MONOCHROME TEST-SIGNAL TO A COLOR VIDEO SIGNAL

[75] Inventors: Keith R. Frantz; James W. Hauer, both of Myerstown, Pa.; Mark E. Carpenter, Knoxville, Tenn.

[73] Assignee: RCA Licensing Corporation, Princeton, N.J.

[21] Appl. No.: 89,208

[22] Filed: Aug. 25, 1987

[51] Int. Cl.⁴ .............................................. H04N 17/02
[52] U.S. Cl. ........................................ 358/10; 358/81
[58] Field of Search ...................... 358/10, 81, 82, 22, 358/21 R

[56] References Cited

U.S. PATENT DOCUMENTS 3,761,607  9/1973  Hanseman .............................. 358/81
3,770,884  11/1973  Curran et al. ......................... 358/81
3,975,762  8/1976  van den Bosch ...................... 358/81
4,149,185  4/1979  Weinger ................................ 358/81

Primary Examiner—Howard W. Britton
Assistant Examiner—Victor R. Kostak
Attorney, Agent, or Firm—E. M. Whitacre; D. H. Irlbeck; L. L. Hallacher

[57] ABSTRACT

A circuit for converting a monochrome video signal into individual video color signals includes a gate means for individually energizing the color guns of a color picture tube. Control logic sequentially enables the gates so that only one electron gun is energized at a given instant. The circuit works in cooperation with a commercially available pattern generator so that a plurality of rows of patterns of a particular color are scanned across the face of the screen. Because of the sequential scanning, various rows of the selected pattern are composed of the three primary colors.

9 Claims, 3 Drawing Sheets

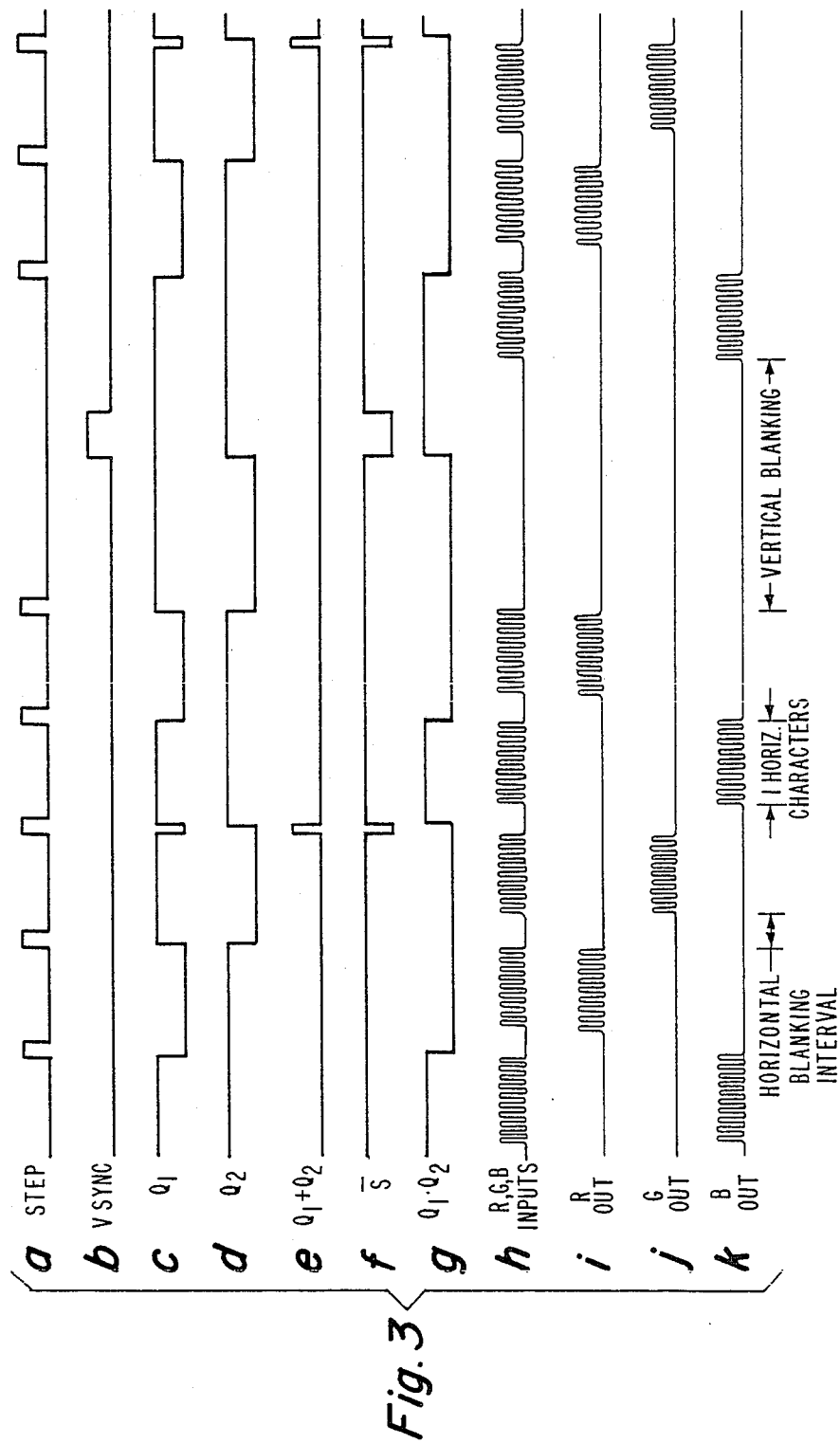

CIRCUIT FOR CONVERTING A MONOCHROME TEST SIGNAL TO A COLOR VIDEO SIGNAL

BACKGROUND

This invention relates generally to signal generators for testing kinescopes and particularly to a circuit for converting a monochrome test signal into individual video color signals for a color display, such as a video monitor.

Among the final stages of manufacturing color kinescopes for video monitors, are the adjustment of the electron beam focusing and convergence. Typically, convergence is a subsequent adjustment but because convergence is affected by focus voltage, focusing must be proper before making any convergence adjustments. Focusing can be facilitated by the use of arbitrary character patterns to cause all three primary colors to be simultaneously displayed on the tube to permit optimizing focusing at all locations on the tube screen. Without an arbitrary test pattern, setting the focus becomes an iterative procedure that is very time consuming. Commercially available test pattern generators do not provide the capability of generating test patterns in all three of the primary colors. However, many commercially available test pattern generators do provide the capability of generating monochrome arbitrary patterns and all necessary synchronization signals. For this reason there is a need for a circuit for transforming the monochromatic test signal into the primary video colors needed for a color video monitor. The present invention fulfills this need.

SUMMARY

A circuit for transforming a monochromatic test signal from a signal generator into individual video color signals for a color display device includes a plurality of color output gate means for receiving the monochromatic test signal and for providing the video color signals to the display device. Control logic means sequentially enables the color output gate means whereby the video color signals are sequentially provided to the video output terminals of the display device.

BRIEF DESCRIPTION OF THE DRAWINGS

FIGS. 3a to 3k are waveforms showing the operation of the preferred embodiment.

DETAILED DESCRIPTION

Figure 1:
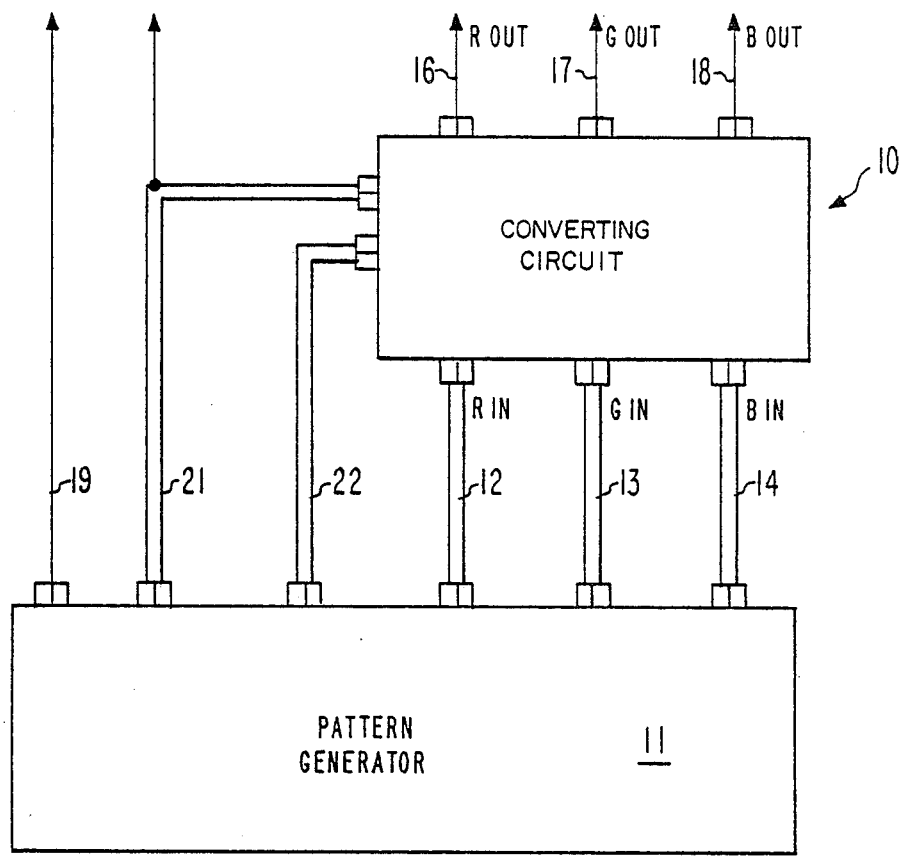
FIG. 1 shows the present invention in combination with a commercially available pattern generator.

FIG. 1 shows a circuit 10 for converting monochrome test signals provided by a commercially available pattern generator 11 into patterns having the three primary video colors. The pattern generator can be a Quantum Data (Carol Stream, IL) 801 generator. The circuit 10 receives typical standard monochrome video signals on three input lines 12, 13 and 14 and provides individual color signals on output lines 16, 17 and 18. Lines 16, 17 and 18 thus provide the red, green and blue video signals needed to produce color on a color monitor. The pattern generator 11 also provides horizontal sync signals to the receiver being adjusted by way of an output line 19. Vertical drive signals are provided by the test generator 11 to the monitor and to the circuit 10 by way of an output line 21. Step signals are provided to the circuit 10 by an output line 22.

Figure 2:
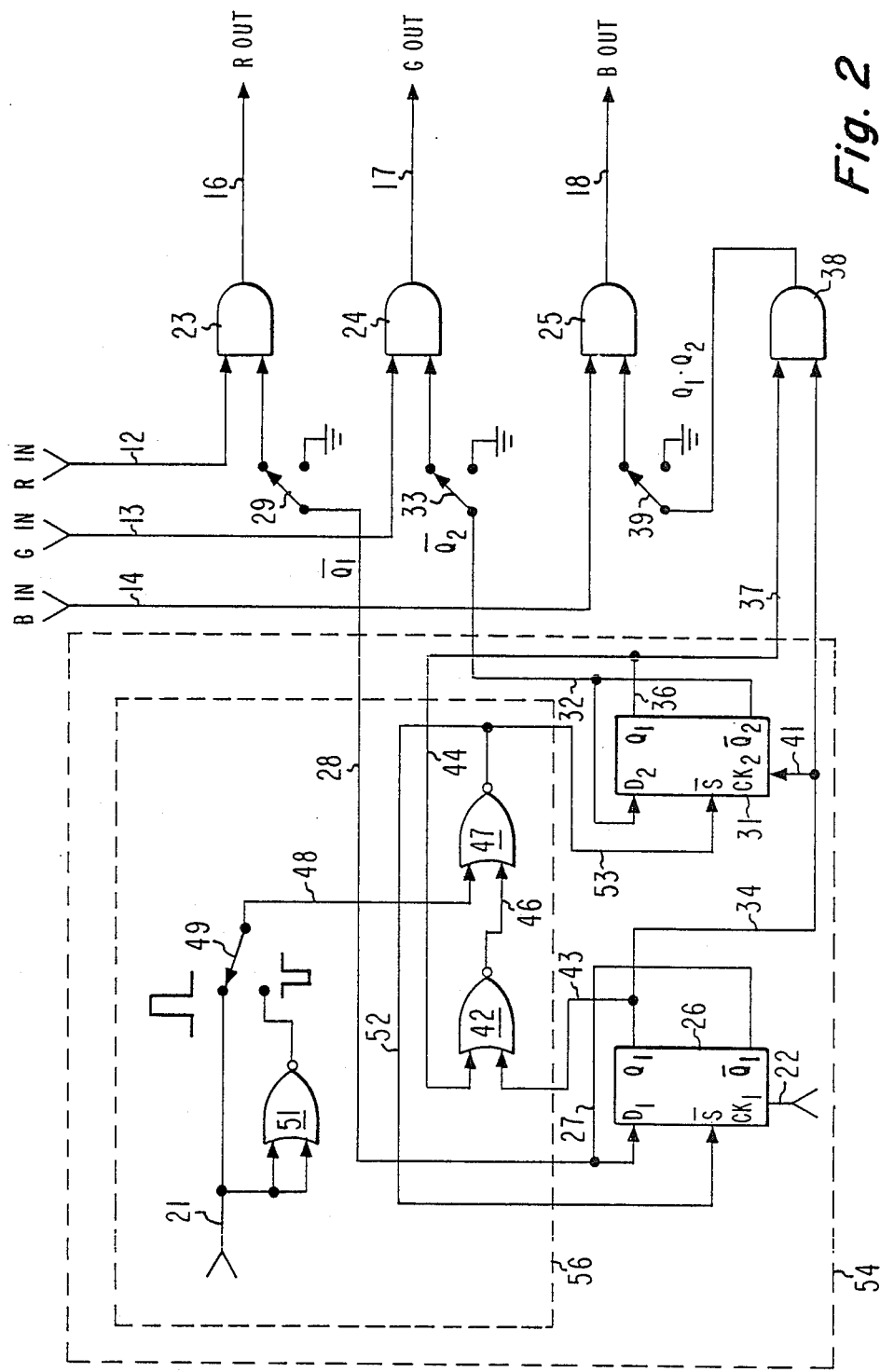
FIG. 2 is a logic diagram of a preferred embodiment.

In FIG. 2, the output lines 16, 17 and 18 are energized by color output gates 23, 24 and 25, respectively, preferably AND gates. The AND gates 23, 24 and 25 respectively receive the monochrome video signal from lines 12, 13 and 14. The AND gate 23 receives the Q1 output of a flip-flop 26, preferably a D-type flip-flop, by way of lines 27, 28 and a center off switch 29. The AND gate 24 receives the Q2 output of another D-type flip-flop 31 via a line 32 and a center off switch 33. The output of an additional AND gate 38 is coupled to the AND 25 gate through a center off switch 39. The Q1 output of the flip-flop 26 is coupled to one input terminal of the AND gate 38 by line 34. The Q2 output of the flip-flop 31 is coupled to the other input terminal of the AND gate 38 by lines 36, 37. Accordingly, the Q1·Q2 product is applied to the AND gate 25.

The clock input of the flip-flop 26 receives set pulses, such as those shown in FIG. 3a from the line 22. The Q1 output of the flip-flop 26 is coupled to the clock input of the flip-flop 31 by the line 34 and a line 41. The input terminals of a NOR gate 42 are coupled to the Q1 output of the flip-flop 26 by a line 43, and to the Q2 output of the flip flop 31 by a line 44. Accordingly, the output line 46 of the NOR gate 42 is high only when both the Q1 and Q2 outputs of the flip-flops 26 and 31, respectively, are low as shown in FIG. 3e. A NOR gate 37 receives the output of the NOR gate 42 and a vertical sync pulse by a line 48 and a switch 49. An additional NOR gate 51, in combination with the switch 49, permits the use of a negative sync pulses if desired. The output of the NOR gate 47 is coupled to the $\overline{S}$ input terminals of the flip-flops 26 and 31 by lines 52 and 53 respectively. Accordingly, the control logic means 54 for the output gates 23, 24, and 25 includes the two bistable logic circuits 26 and 31 and the sync logic 56, which, preferably is composed of the NOR gates 42, 47 and 51.

In operation, the three AND gates 23, 24 and 25 simultaneously receive the monochrome video signal of FIG. 3h from the pattern generator 11 by way of the input lines 12, 13 and 14. However, the gates 23, 24 and 25 remain disabled until the other input line of one of three gates goes high. Initially, the Q1 output of flip-flop 26 and the Q2 output of the flip-flop 31 are both high as shown in FIGS. 3c and 3d. Accordingly, the Q1·Q2 output of the AND gate 38, shown in FIG. 3g, is high and the AND gate 25 is enabled so that the output line 18 is also high, as shown in FIG. 3k. The output of the AND gate 25 is applied to the blue gun of the monitor so that the test patterns displayed across one, or more rows, of the tube are blue, depending upon the timing of step pulses of FIG. 3a and the horizontal sweep rate of the monitor being adjusted. When the next step pulse of FIG. 3a is applied to the clock input of the flip-flop 26 by the line 22, the Q1 output goes low to disable the AND gate 38 and thus also the AND gate 25. The blue gun of the monitor is then unenergized. Simultaneously, the Q1 of the flip-flop 26 output goes high to enable the flip-flop 23 and the output line 16 goes high, as shown in FIG. 3i, to enable the red gun of the tube being adjusted and a number of red test patterns are scanned across one, or more rows of the the tube screen. When the next step pulse of FIG. 3a is applied to the clock input of the flip-flop 26 the Q1 output of flip-flop 26 goes high to clock flip-flop 31 and the Q2 output of the flip flop 31 goes low, as shown in FIG. 3d. Also, the Q1 output of flip-flop 26 goes low to disable the AND gate 23. When the Q2 output of the flip-flop 31 goes low the Q2 output goes high to enable the AND gate 24 and the output line 17 goes high, as shown in FIG. 3j, and a plurality of green patterns are scanned across one, or more, rows of the screen of the tube being adjusted. When the next step pulse is received both Q1 and Q2 momentarily go low and the output line 46 of the NOR gate 42 momentarily goes high and the output of the NOR gate 47 goes low causing the $\overline{S}$ inputs of the flip-flops 26 and 31 to go low, as shown in FIG. 3f. The control logic circuit 54 thus returns to its original state wherein Q1 and Q2 are high causing the blue output to be provided to the tube being adjusted. This alternate and sequential actuation of the AND gates 23, 24 and 25 continues until the next vertical sync pulse, FIG. 3b, is received to reset the system. The vertical sync pulse occurs during the vertical blanking period and therefore does not interfere with the generation of the color video output signals. Also, the first color test pattern is always the selected color, such as blue in the example given, because of the timing of the sync pulses during the vertical blanking period. The switches 29, 33 and 39 permit one, or all, of the gates 23, 24 and 25 to be blanked off completely and the inventive circuit need not be disconnected from the video path for other testing. Also, the AND gates 23, 24 and 25 preferably are TTL, for which an open input is high. Accordingly, by setting one the switches 29, 33, or 39 to the grounded center position the associated AND gate is continuously enabled. The entire screen can then be scanned with the selected color. This is a very useful ability when checking for focus and convergence.

What is claimed is:

1. A circuit for transforming a monochromatic test signal from a signal generator into individual video color signals for a color display device comprising:

a plurality of color output gate means for receiving said monochromatic test signal and for providing said video color signals to said display device; and control logic means for sequentially enabling said color output gate means whereby said video color signals are sequentially provided to the video input terminals of said display device;

said control logic means including a plurality of bistable logic means, each of said bistable logic means having one output terminal arranged to enable a different one of said output gate means, each of said bistable logic means also having another output terminal arranged to enable another of said output gate means through an additional gate means.

2. The circuit of claim 1 wherein said bistable logic means are flip-flops, the clock input of one of said flip-flops being responsive to said another output terminal of the other of said flip-flops.

3. The circuit of claim 2 wherein the clock input of said other flip-flop is responsive to a step input from said signal generator whereby said color output gate means are sequentially enabled in response to said step input.

4. The circuit of claim 3 further including sync logic for receiving a sync pulses from said signal generator, said flip-flops being responsive to said sync logic, said sync logic also being responsive to said another output terminals of said flip-flops whereby said video color signals are synchronized with the vertical sync of said signal generator.

5. The circuit of claim 4 wherein said sync logic includes a plurality of NOR gates.

6. The circuit of claim 5 wherein said output gate means are AND gates.

7. The circuit of claim 6 further including switch means for selectively enabling and disabling said AND gates.

8. The circuit of claim 1 further including switch means for selectively enabling and disabling said color output gate means.

9. The circuit of claim 8 wherein said color output gate means are AND gates.

* * * * *